(12) United States Patent
Ferre (10) Patent No.: US 6,779,768 B1
(45) Date of Patent: Aug. 24, 2004

(54) ADJUSTABLE FAN SUPPORT BRACKET FOR A PORTABLE ELECTRIC FAN

(76) Inventor: Daniel E. Ferre, 920 Edinburg Rd., Hamilton, NJ (US) 08690

( * ) Notice: Subject to any disclaimer, the term of this patent is extended or adjusted under 35 U.S.C. 154(b) by 0 days.

(21) Appl. No.: 10/413,780

(22) Filed: Apr. 15, 2003

(51) Int. Cl.⁷ .................................................. A47F 5/00
(52) U.S. Cl. .................................................. 248/309.1
(58) Field of Search ........................... 248/309.1, 188.8, 248/447, 176.1, 188.1, 351, 474, 466, 476, 472, 460, 462, 463; 415/126; 416/244 R, 246; 211/5

(56) References Cited

U.S. PATENT DOCUMENTS

| | | | | |
|---|---|---|---|---|
| 404,146 A | * | 5/1889 | Ackerman | 248/465 |
| 410,226 A | * | 9/1889 | White | 248/449 |
| 2,011,791 A | * | 8/1935 | Barrett | 416/244 R |
| 2,073,868 A | * | 3/1937 | Fladeland | 416/246 |
| 2,100,923 A | * | 11/1937 | Schmidt et al. | 416/246 |
| 2,215,035 A | | 9/1940 | Gundelfinger | 416/247 R |
| 2,620,127 A | | 12/1952 | Radcliffe | 416/244 R |
| 2,857,095 A | * | 10/1958 | Suarez Grau | 416/246 |
| 2,862,657 A | * | 12/1958 | Copeland et al. | 416/247 R |
| 2,904,298 A | | 9/1959 | Tateishi | 248/127 |
| 3,226,077 A | * | 12/1965 | Killen | 248/448 |
| 3,347,452 A | | 10/1967 | Radcliffe | 416/170 R |
| 3,715,097 A | * | 2/1973 | Kalajian | 248/449 |
| 3,718,308 A | * | 2/1973 | Hainault | 248/460 |
| 3,954,246 A | * | 5/1976 | Sparkman | 248/453 |
| 4,042,203 A | * | 8/1977 | Warkentin | 248/449 |
| 4,131,060 A | * | 12/1978 | Caine | 98/116 |
| 4,850,804 A | | 7/1989 | Huang | 416/246 |
| 5,205,711 A | * | 4/1993 | Raczykowski | 416/63 |
| 5,232,090 A | * | 8/1993 | Raab et al. | 206/320 |
| 5,342,174 A | * | 8/1994 | Litvin | 416/246 |
| 5,395,087 A | * | 3/1995 | VanBasten | 248/397 |
| 5,435,695 A | | 7/1995 | Chiu et al. | 416/244 R |
| 5,503,526 A | * | 4/1996 | Neils et al. | 416/63 |
| 5,765,799 A | * | 6/1998 | Weber | 248/453 |
| 5,927,676 A | * | 7/1999 | Lefton | 248/472 |
| 6,126,415 A | * | 10/2000 | Lasko | 417/423.15 |
| 6,427,393 B1 | * | 8/2002 | Chen et al. | 52/167.1 |
| 6,585,021 B2 | * | 7/2003 | Clark et al. | 156/391 |
| 2003/0168571 A1 | * | 9/2003 | Malejko et al. | 248/447.1 |

* cited by examiner

*Primary Examiner*—Leslie A. Braun
*Assistant Examiner*—Kofi Schulterbrandt
(74) *Attorney, Agent, or Firm*—Watov & Kipnes, P.C.; Kenneth Watov (57) ABSTRACT

A fan support bracket which includes a first member having a proximal end and distal end portions, a second member extending from and hingedly connected to the proximal end of the first member, wherein the second member can be displaced angularly from the first member; and manually operable clips individually rigidly mounted upon the distal end portions of the first member, and a free end of the second member, for attaching these ends to the back end or grill of a box fan, for safely and securely retaining the fan at a desired angle to control the path of the airflow.

23 Claims, 6 Drawing Sheets

FIG. 9 ly electric fan such as a box fan. Typically, conventional box fans rest in a vertical position on the floor. Accordingly, airflow is generated in a horizontal direction parallel to the floor, the airflow being

US 6,779,768 B1

ADJUSTABLE FAN SUPPORT BRACKET FOR A PORTABLE ELECTRIC FAN

FIELD OF THE INVENTION

The present invention relates generally to portable electric fans, and more particularly to fan support brackets for enabling a portable electric fan such as a box fan to be oriented at a desirable non-vertical position on the floor.

BACKGROUND OF THE INVENTION

Portable electric fans have been used for generating air movement within an enclosed area, thus enhancing air circulation. A popular type of portable electric fan is the box fan. The box fan provides relatively good airflow characteristics and is easy to maintain and store. The box fan typically includes a generally rectilinear housing having an air inlet at one end and an air outlet at the other end with a fan unit housed therebetween. The fan unit enclosed within the housing includes a central hub mounted to an electric motor which functions to rotatably drive the central hub. The central hub driven by the electric motor includes radiating blades placed and twisted so that each form part of a helical surface for moving air therethrough.

Although box fans produce good airflow in an energy efficient manner, a user typically is unable to easily and safely adjust the angular position of the box fan to redirect the airflow. Users may simply attempt to lean the box fan on another object (e.g., furniture) or prop the fan in position by placing objects (e.g., books or magazines) under one side. Such measures can obstruct airflow and reduce efficiency, or provide inadequate where the propped fan can easily tip or fall on its side, presenting a safety hazard.

In view of the problems in the prior art, there is a need for a device which allows the user to safely, quickly and easily adjust the angular position of a box fan in a cost effective and secure manner, for redirecting airflow. It would be further desirable to design a device which can enable the user to adjust the angular position of the box fan without diminishing the performance and operation thereof, to redirect the airflow away from the user's legs, for example.

SUMMARY OF THE INVENTION

The present invention relates to a fan support bracket adapted for attachment to a box fan to allow a user to adjust the orientation of the box fan to a non-vertical position so that the direction and orientation of the airflow generated can be varied as desired. The fan support bracket of the present invention can be implemented effectively in a simple and secure manner without adversely affecting the airflow generated by the fan or diminishing the fan stability. The fan support bracket generally comprises a body portion having two ends, wherein one end is configured for secure attachment to a portion of a box fan and the other end configured for placement on a fixed support surface.

In one aspect of the present invention, there is provided a fan support bracket for a portable electric fan having a front end and an opposing back end, which generally comprises an elongated body having a proximal end for placement on a support surface and a distal end adapted for releasable attachment to the back end of the fan to enable the fan to be moved to and securely retained at a desired non-vertical position.

In one particular aspect of the present invention, there is provided a fan support bracket for a portable electric fan having a front end and an opposed back end, the fan support bracket comprising:
a first member having at least a proximal end and a distal end;
a second member extending from and hingedly connected to the proximal end of the first member, wherein the second member can be displaced angularly from the first member; and
attachment means rigidly and individually mounted upon the proximal ends, respectively, for attaching these ends to one of the front and back ends of the fan for retaining the fan at a desired angle to control the path of airflow therefrom.

In another particular aspect of the present invention, there is provided a fan support bracket for a portable electric fan having a front end and an opposed back end, which comprises:
a U-shaped member having first and second elongated free end portions extending substantially co-extensively from a common end portion thereof;
a central elongated member hingedly attached at one end to the common end portion of the U-shaped member, the central elongated member having a free end extending substantially co-extensively with the first and second elongated end portions; and
attachment means rigidly mounted on each of the first and second elongated end portions, and the free end of the central elongated member, for attaching the bracket to the back end of the fan, the point of attachment at the central elongated member being selectable for retaining the fan at a desired angle relative to the horizontal plane.

BRIEF DESCRIPTION OF THE DRAWINGS

Various embodiments of the invention are described in detail below with reference to the drawings, in which like items are identified by the same reference designation, wherein.

DETAILED DESCRIPTION OF THE INVENTION

The present invention is directed to a fan support bracket for permitting a user to adjust the angular position of a box fan in a simple, safe and secure manner, to control the direction of airflow. The fan support bracket of the present invention is cost effective to make and use. Moreover, the fan support bracket is designed to significantly enhance the stability and safety of the box fan, thus greatly minimizing it from tipping or falling on its side. The fan support bracket of the present invention is designed for use with various box fan configurations, and does not diminish the performance or operation of the box fan. The fan support bracket of the present invention is constructed for durability and compactness, thus affording extended use and easy storage. The fan support bracket of the present invention is adapted to be universally used with any type or make of box fan. In addition, the fan support bracket is easy and cost effective to fabricate using commercially available manufacturing techniques.

Figure 1:
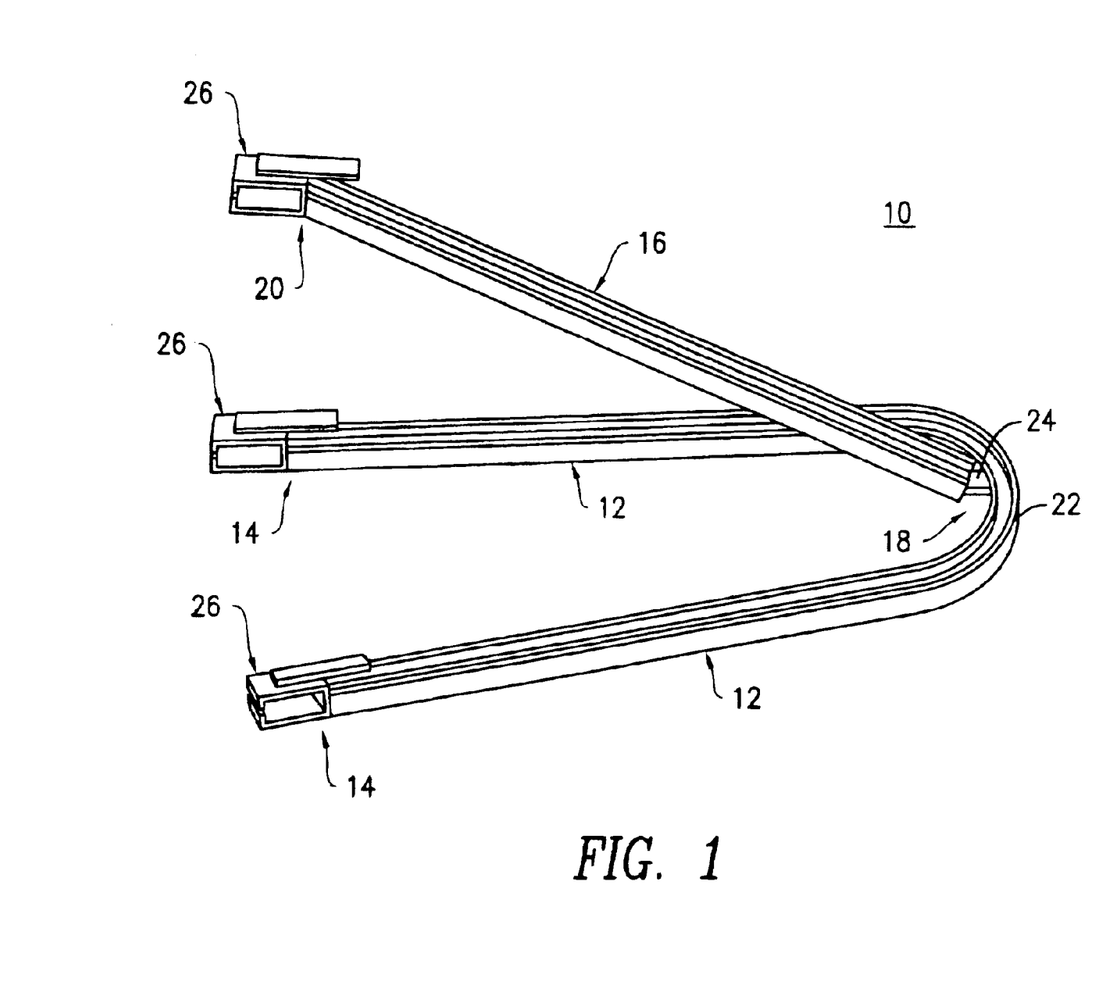
FIG. 1 is a perspective view of a fan support bracket for one embodiment of the present invention.

With reference to FIG. 1, a fan support bracket, or a bracket, is shown and illustrated for one embodiment of the present invention, and is indicated generally by the reference numeral 10. The bracket 10 generally comprises a U-shaped base portion 12 having a pair of side arms 14 which are joined at a common end 22, and a central arm 16 movably positioned between the side arms 14 with a distal free end 20 and an opposed proximal end 18 connected to the common end 22 of the base portion 12 via a flexible joint 24 preferably in the form of a flexible web providing a flexible hinge. The central arm 16 is adapted to move relative to the base portion 12. The free distal end 20 of the central arm 16 and the free ends of the side arms 14 each include a clip 26 rigidly mounted thereon. In one embodiment, the clips 26 can be attached to the central arm 16 and side arms 14 of the base portion 12 through suitable methods including ultrasonic welding.

The bracket 10 can be constructed from any suitable rigid material including, but not limited to, plastic, metal, wood, and the like. In a preferred embodiment, the bracket 10 is constructed from a plastic material selected from polyethylene, polystyrene, polyvinyl chloride, acrylonitrile butadiene styrene (ABS), nylon, polycarbonate, polyester, acrylic resin, acetal resin, polyolefin, and the like, and combinations thereof. The bracket 10 can be fabricated through conventional techniques including molding. For example, if plastic material is used, the bracket 10 can be molded as a single piece.

Figure 2:
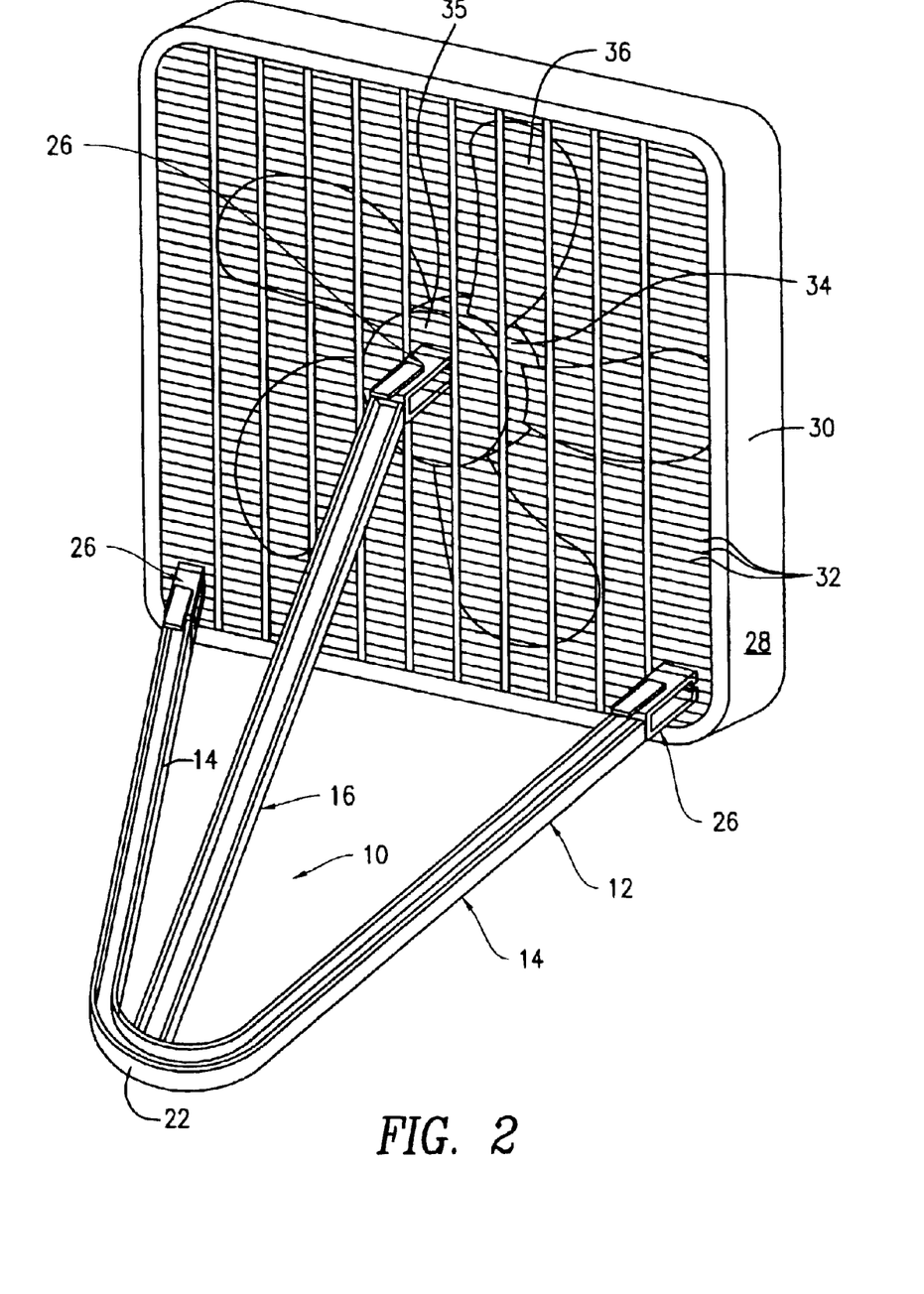
FIG. 2 is a perspective view of the fan support bracket of the present invention mounted to a box fan.

Referring to FIG. 2, the bracket 10 is shown securely mounted to a box fan 28 to provide support and allow the angular position of the box fan 28 to be adjusted for controlling the direction of airflow therefrom. The box fan 28 generally includes a rectilinear housing 30 which has an air passing grill 32 mounted at each opposed open end of the housing 30 to permit a continuous airflow therethrough, a central hub 34 with a plurality of fan blades 36 attached thereto, and an electric motor 35 operatively engaged to the central hub 34 for rotatably driving the fan blades 36 to generate airflow therethrough.

The bracket 10 is generally attached to the box fan 30 with the base portion 12 positioned below the central arm 16 as shown. Preferably, the bracket 10 is attached to the inlet side of the box fan 10. The central arm 16 is secured to the grill 32 via attachment of the associated clip 26. The pair of side arms 14 are each secured to a lower portion of the grill 32 via attachment of the associated clips 26, respectively. Once the bracket 10 is secured, the box fan 28 can be adjusted and maintained at a desired non-vertical position or angle by selecting the appropriate point of attachment of the central arm 16. It is noted that the means for attaching the central and side arms to the grill of the box fan is not limited to a clip 26, and can include other types of attaching means or fasteners as known in the art.

Figure 3:
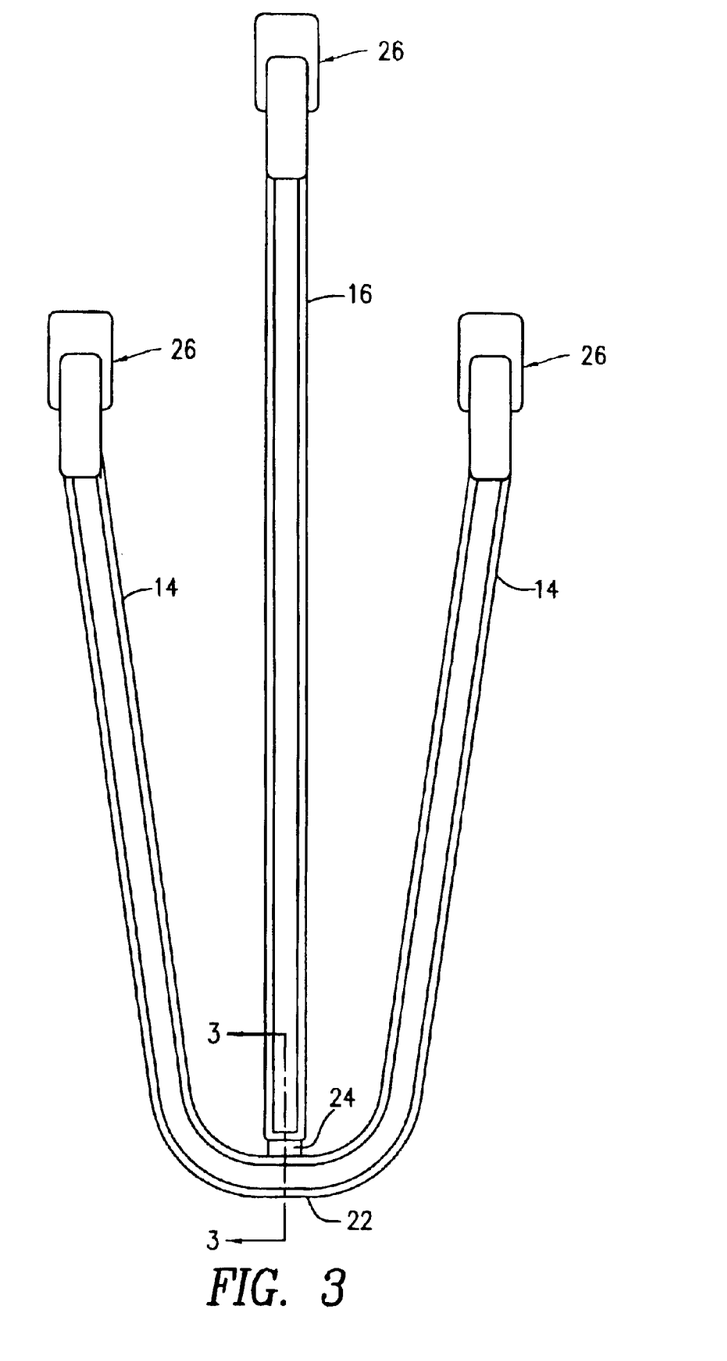
FIG. 3 is a top plan view of the fan support bracket in accordance with the present invention.

Referring to FIG. 3, a top plan view of the bracket 10 is shown. The central arm 16 is positioned between the side arms 14 and is adapted to move freely in a vertical plane therebetween via the flexible joint or living hinge 24. In this embodiment, the central arm 16 is relatively longer in length than the side arms 14. It is noted that the relative lengths are not critical and may vary as required to accommodate box fans of various dimensions. The clips 26 of the side arms 14 are each offset at a slight angle to ensure level and flush mounting engagement with the grill 32 of the box fan 28.

Figure 4:
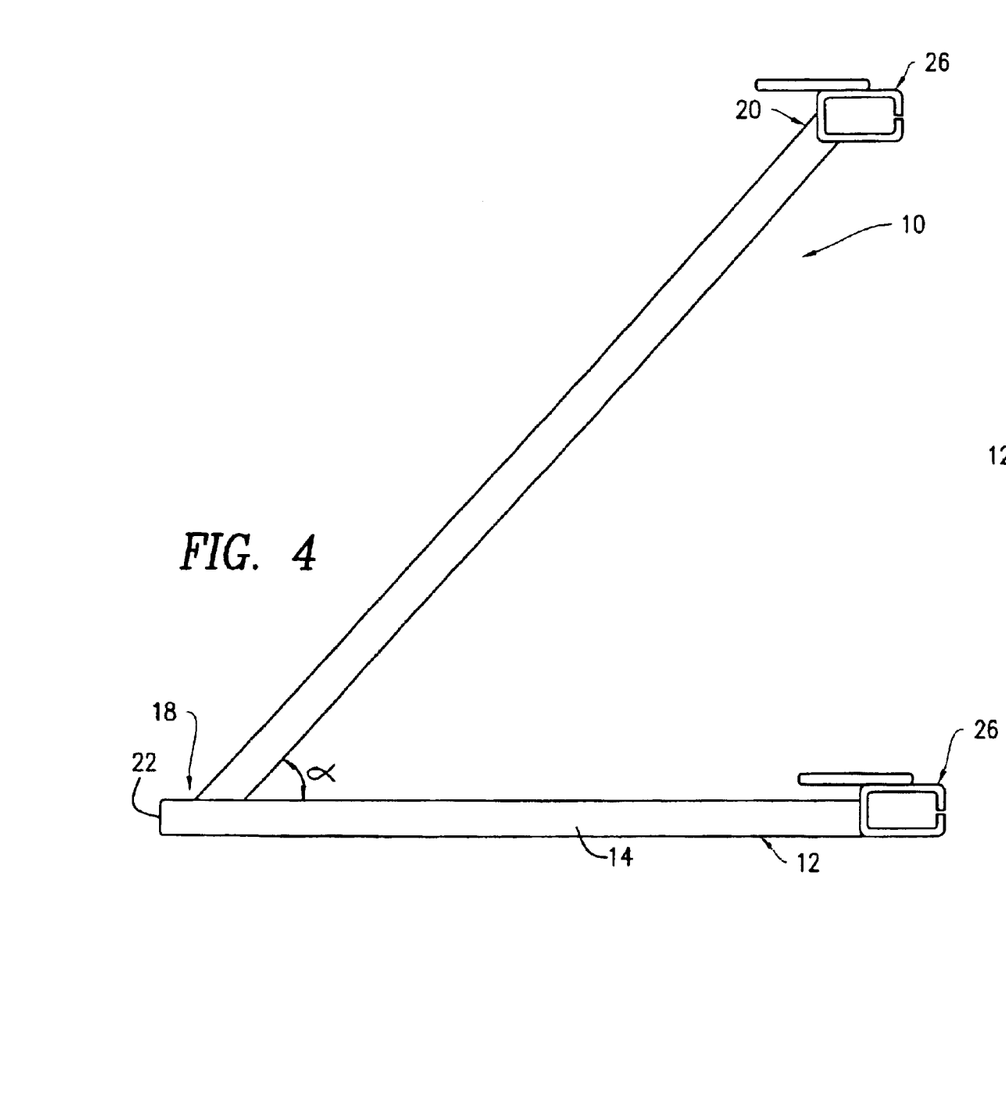
FIG. 4 is a side elevational view of the fan support bracket in accordance with the present invention.

Referring to FIG. 4, the bracket 10 is shown with the central arm 16 moved to an elevated position from the horizontal plane of side arms 14. As described above, the central arm 16 is movable about the flexible joint or living hinge 24 to form an angle, $\alpha$, as measured between the central arm 16 and the base portion 12.

Figure 5:
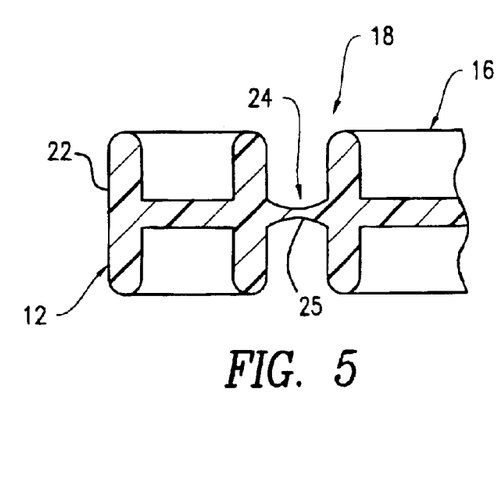
FIG. 5 is a cross-sectional view of a living hinge of the fan support bracket along lines 3—3 of FIG. 3 in accordance with the present invention.

Referring to FIG. 5, a cross-sectional view of the common end 22 of the base portion 12, the proximal end 18 of the central arm 16, and the flexible joint or living hinge 24, is shown along lines 3—3 of FIG. 3. The central arm 16 and the base portion 12 are each preferably formed to yield an I-beam structure for providing enhanced rigidity and strength while minimizing weight and material usage. The flexible joint or living hinge 24 is generally corn posed of a flexible web 25 having a continuous structure extending between the central arm 16 and the common end 22 of the base portion 12, wherein the web 25 is made sufficiently thin for establishing flexibility. In this embodiment, the flexible joint or living hinge 24, the central arm 16 and the base portion 12 are each fabricated from a rigid plastic polymer material. In one embodiment of the present invention, the web 25 can be composed of a molded plastic polymer material such as, for example, polyvinyl chloride (PVC), polyethylene, nylon, polyolefin or the like.

Figures 6, 7:
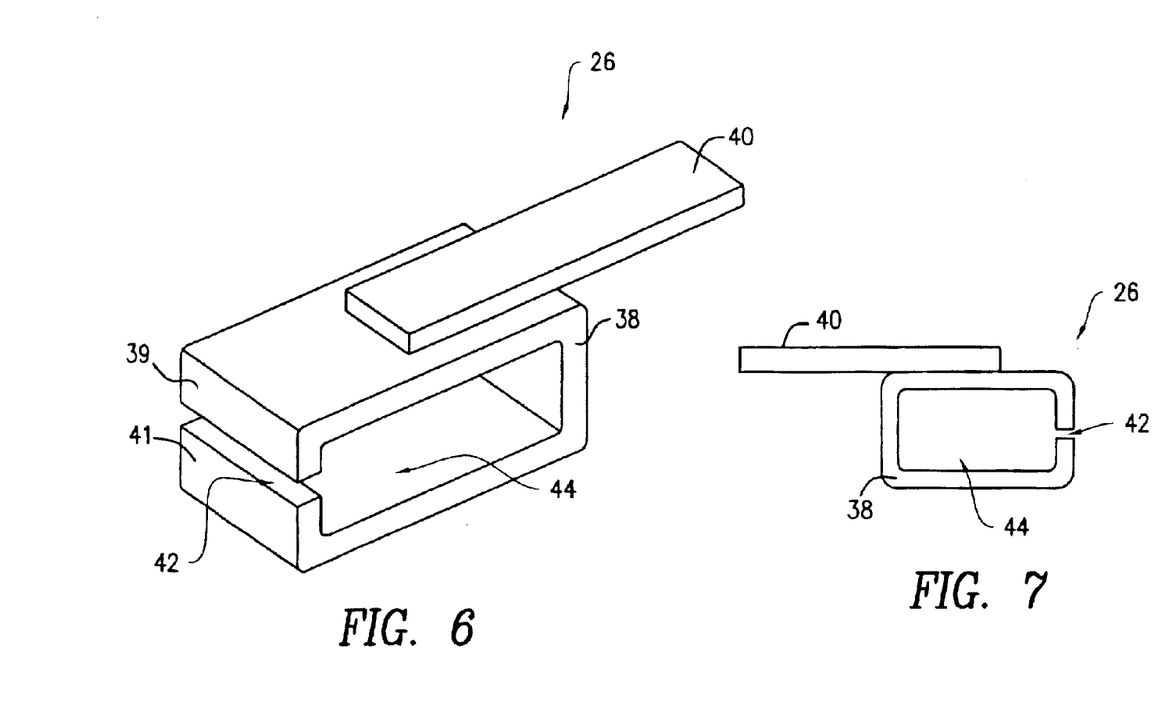
FIG. 6 is a perspective view of an attachment member of the fan support bracket in accordance with the present invention.
FIG. 7 is a side elevational view of the attachment member of the fan support bracket in accordance with the present invention.
Figure 8:
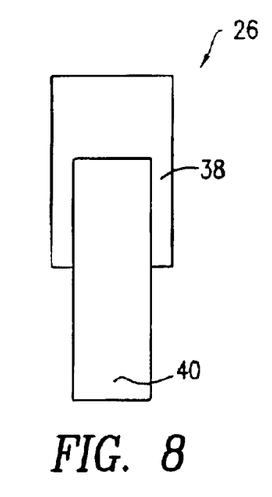
FIG. 8 is a top plan view of the attachment member of the fan support bracket in accordance with the present invention.

With reference to FIGS. 6 to 8, the clip 26 includes a clip body 38 having an upper portion 39 and a lower portion 41, a clip handle 40 attached to a top portion of the clip portion 38, and a slot 42 in communication with a cavity 44 for receiving a portion of the box fan grill 32. The clip handle 40 can be urged downwardly by applying a force on top thereof. This causes the upper and lower portions 39 and 41 to move apart and extends the slot 42 therebetween, thus permitting the grill portion to be received by the cavity 44. The clip handle 40 can then be released and the upper and lower portions 39 and 41 return to the unloaded position, respectively, thereby captively retaining the grill portion in position within the cavity 44. The clip 26 is suitably dimensioned to avoid contact with the fan blades 36 during operation of the box fan 28 while sufficiently accommodating the grill portion to be retained in the cavity 42 thereof.

Figure 9:
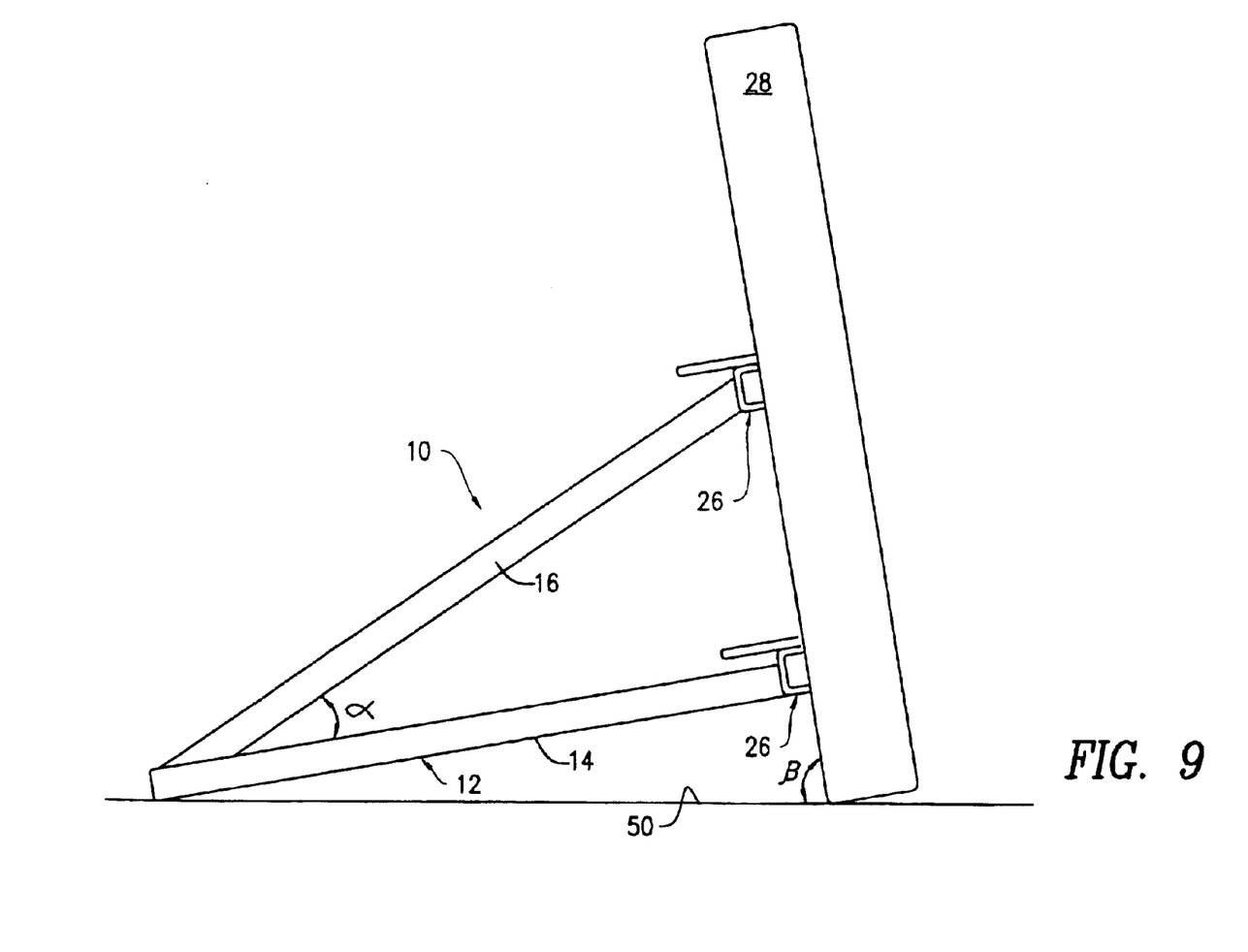
FIG. 9 is a side elevational view of the fan support bracket of the present invention mounted to the box fan.

With reference to FIG. 9, the bracket 10 is shown mounted to the box fax 28. As described above, the central arm 16 is adapted for movement relative to the side arms 14 of the base portion 12 to form a desired angle $\alpha$ therebetween. The bracket 10 permits the box fan 28 to angularly move relative to the floor 50 to form an angle $\beta$ therebetween. The angle $\alpha$ increases as the clip 26 of the central arm 16 is mounted to upper portions of the grill 32, while angle $\beta$ decreases. Alternatively, angle $\alpha$ decreases as the clip 26 of the central arm 16 is mounted to the lower portions of the grill 32, while angle $\alpha$ increase. In this manner, the user is able to vary the angular position of the box fan 28 as desired for controlling the direction of path of airflow from the box fan 28.

Although various embodiments of the invention have been shown and described, they are not meant to be limiting. Those of skill in the art may recognize various modifications to these embodiments, which modifications are meant to be covered by the spirit and scope of the appended claims. In one example of the present invention, the hinge portion can be provided by a standard hinge rather than a living hinge or flexible hinge as described hereinabove, depending on the typed of material used to fabricate the bracket.

What is claimed is:

1. A fan support bracket for a portable electric fan having a front end and an opposed back end, comprising:
    a first member having a proximal end for positioning on a base upon which the fan is to be placed, and a distal end;
    a second member having a proximal end for positioning on said base, and a distal end;
    said proximal ends of said first and second members being rigidly connected together;
    a third member having a proximal end hingedly connected to the joined proximal ends of the first and second members, said third member further including a distal end, wherein said third member can be displaced angularly from said first and second members; and
    manually operable and selectively releasable attachment means permanently and individually mounted upon the distal ends of said first, second, and third members, respectively, for removably attaching these ends to one of the front and back ends of said fan for retaining said fan at a desired angle as determined by the selected angle of said third member relative to said first and second members to control the path of airflow therefrom.

2. The fan support bracket of claim 1, wherein the third member is connected to the proximal ends of the first and second members via a flexible web provided by a single piece of material.

3. The fan support bracket of claim 1, wherein the first member comprises a U-shaped body having first and second elongated distal end portions extending substantially co-extensively from a common proximal end portion thereof.

4. The fan support bracket of claim 3, wherein said attachment means are individually mounted upon the first and second elongated distal end portions of said first member, respectively.

5. The fan support bracket of claim 3, wherein said attachment means consist of a manually operable clip.

6. The fan support bracket of claim 1, comprising a material selected from group consisting of plastic, metal, wood and combinations thereof.

7. The fan support bracket of claim 6, wherein the plastic is further selected from the group consisting of polyethylene, polystyrene, polyvinyl chloride, acrylonitrile butadiene styrene, nylon, polycarbonate, polyester, acrylic resin, acetal resin, polyolefin and combinations thereof.

8. The fan support bracket of claim 1, wherein the first and second members each further comprise an I-beam construction.

9. The fan support bracket of claim 1, wherein said attachment means is a manually operable clip.

10. The fan support bracket of claim 9, wherein the clip is mounted to each of said first and second members by ultrasonic welds.

11. A fan support bracket for a portable electric fan having a front end and an opposed back end, comprising:
    a U-shaped member having first and second elongated end portions extending substantially co-extensively from a common end portion thereof;
    a central elongated member hingedly attached at one end to the common end portion of the U-shaped member, said central elongated member having a free end extending substantially co-extensively with the first and second elongated end portions; and
    manually operable selectively releasable attachment means permanently mounted on each of the first and second elongated end portions and the free end of said central elongated member, for removably attaching said bracket to the back end of said fan, the point of attachment of said central elongated member being selectable for adjusting the angle between said central elongated member and said U-shaped member, for retaining the fan at a desired angle relative to the horizontal plane.

12. The fan support bracket of claim 11, wherein said attachment means is a manually operable clip.

13. The fan support bracket of claim 11, wherein said U-shaped member, and central elongated member are formed from a single piece of plastic material.

14. The fan support bracket of claim 13, wherein a living hinge provides the hinged attachment between said U-shaped member and central elongated member.

15. The fan support bracket of claim 11, wherein said U-shaped member, and central elongated member consist of plastic material.

16. The fan support bracket of claim 15, wherein a living hinge provides the hinged attachment between said U-shaped member and central elongated member.

17. The fan support bracket of claim 14, wherein said attachment means consists of a manually operably clip.

18. The fan support bracket of claim 16, wherein said attachment means consists of a manually operable clip.

19. The fan support bracket of claim 18, wherein the manually operable clip further comprises:
    a C-shaped member having upper, lower and rear portions cooperatively defining an internal void, said rear portion of said C-shaped member being rigidly mounted on one of the first and second elongated end portions and the free end of said central elongated member;
    a slot in communication with the internal void located on an opposed side from said rear portion and defined by said upper and lower portions of the C-shaped member;
    a lever mounted to the upper portion of the C-shaped member and having a distal end extending beyond the rear portion of the C-shaped member wherein a force can be applied to the distal end of the lever to compel resilient movement of the upper portion of the C-shaped member away from the lower portion of the C-shaped member via a cantilever action.

20. A fan support bracket for a portable electric fan having a front end and an opposed back end, comprising:
    a U-shaped member having first and second elongated end portions extending substantially co-extensively from a common end portion thereof;
    a central elongated member hingedly attached at one end to the common end portion of the U-shaped member, said central elongated member having a free end extending substantially co-extensively with the first and second elongated end portions; and
    attachment means rigidly mounted on each of the first and second elongated end portions and the free end of said central elongated member, for attaching said bracket to the back end of said fan, the point of attachment at said central elongated member being selectable for retaining the fan at a desired angle relative to the horizontal plane wherein said U-shaped member, and central elongated member are formed from a single piece of plastic material.

21. The fan support bracket of claim 20, wherein a living hinge provides the hinged attachment between said U-shaped member and central elongated member.

22. The fan support bracket of claim 21, wherein said attachment means consists of a manually operably clip.

23. A fan support bracket for a portable electric fan having a front end and an opposed back end, comprising:

- a U-shaped member having first and second elongated end portions extending substantially co-extensively from a common end portion thereof;
- a central elongated member hingedly attached at one end to the common end portion of the U-shaped member, said central elongated member having a free end extending substantially co-extensively with the first and second elongated end portions; and
- attachment means rigidly mounted on each of the first and second elongated end portions and the free end of said central elongated member, for attaching said bracket to the back end of said fan, the point of attachment at said central elongated member being selectable for retaining the fan at a desired angle relative to the horizontal wherein said U-shaped member, and central elongated member consist of plastic material; and
- said attachment means consists of a manually operable clip including:
- a C-shaped member having upper, lower and rear portions cooperatively defining an internal void, said rear portion of said C-shaped member being rigidly mounted on one of the first and second elongated end portions and the free end of said central elongated member;
- a slot in communication with the internal void located on an opposed side from said rear portion and defined by said upper and lower portions of the C-shaped member; and
- a lever mounted to the upper portion of the C-shaped member and having a distal end extending beyond the rear portion of the C-shaped member wherein a force can be applied to the distal end of the lever to compel resilient movement of the upper portion of the C-shaped member away from the lower portion of the C-shaped member via a cantilever action.

* * * * *